United States Patent [19]

Kwong

[11] Patent Number: 5,414,242

[45] Date of Patent: May 9, 1995

[54] DEFROSTING MIRROR

[76] Inventor: Ken K. Kwong, 18804 39th Ave. South, Seatac, Wash. 98188-5272

[21] Appl. No.: 248,448

[22] Filed: May 24, 1994

[51] Int. Cl.⁶ ............................................. H05B 3/84
[52] U.S. Cl. ......................................................... 219/219
[58] Field of Search .................. 219/219, 220; 362/140

[56] References Cited

U.S. PATENT DOCUMENTS

| | | | |
|---|---|---|---|
| 720,877 | 2/1903 | Bloch | 362/140 |
| 2,103,384 | 12/1937 | Somohano | 219/219 |
| 2,588,825 | 3/1952 | Goodman | 219/219 |
| 2,693,589 | 11/1954 | Hopkins | 219/219 |
| 2,815,433 | 12/1957 | Zumwalt | 219/219 |

Primary Examiner—Teresa J. Walberg
Attorney, Agent, or Firm—Dean A. Craine

[57] ABSTRACT

A defrosting mirror which includes a heat generating light tube housed inside a box structure. Light from the light tube illuminates the surrenndings via top and bottom openings formed in the box structure. The light tube also conductively heats the front surface of the mirror to prevent frost from forming thereon.

4 Claims, 2 Drawing Sheets

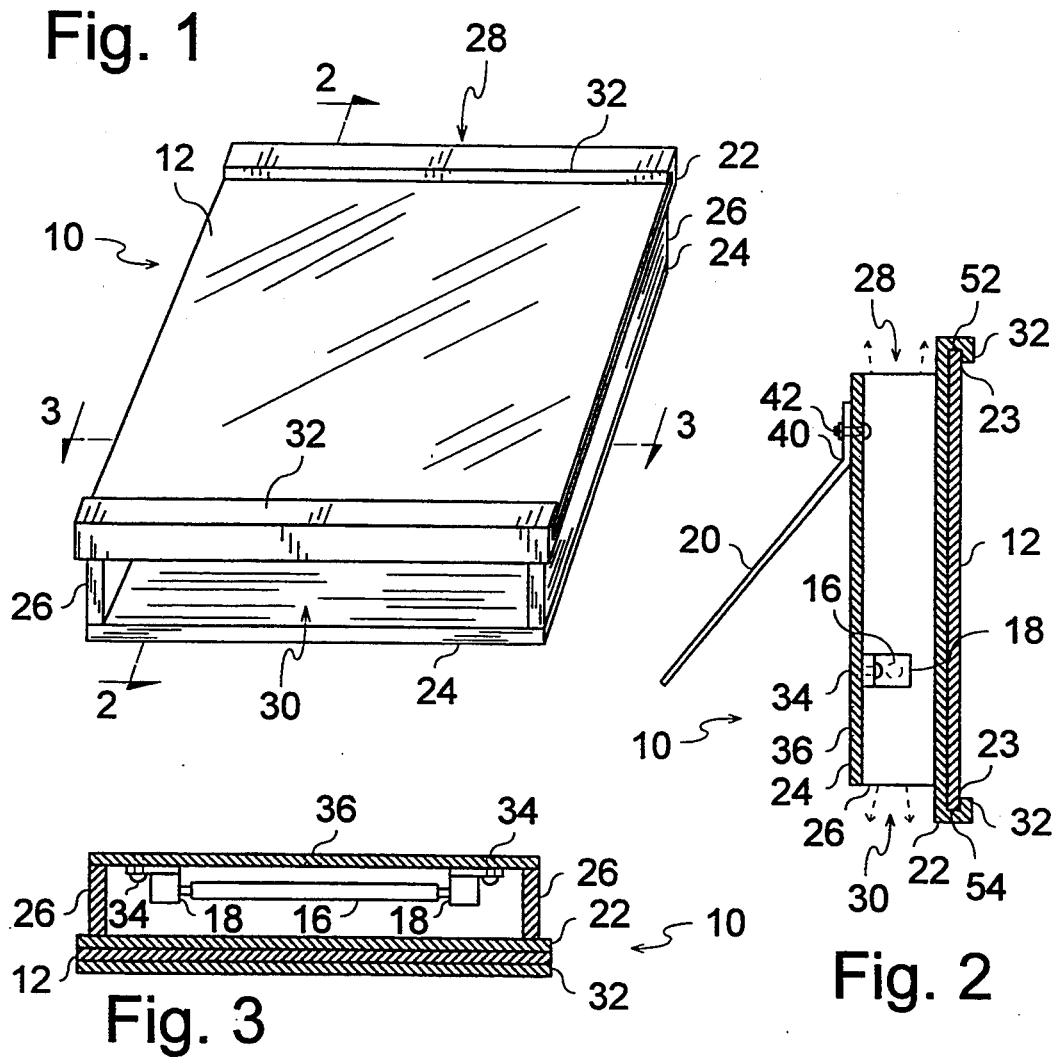

DEFROSTING MIRROR

BACKGROUND OF THE INVENTION

1. Field of the Invention

This invention relates generally to mirrors and pertains more specifically to a mirror that will not frost in a high ambient humidity.

2. Description of the Related Art

Most bathrooms are built with the mirror(s) and the light(s). Yet after a bath, many people need to clean the frost on the mirror before using it for putting on contact lenses or shaving beard.

SUMMARY OF THE INVENTION

An important object of the present invention is to provide a mirror that will not frost in the bathrooms. Another object of the invention is to provide a mirror that is easy to use regardless of the light condition in the room.

Another object is to provide a mirror that will complement the room as a decorative fixture.

Yet another object is to provide a decorative mirror with defrosting light that can be inexpensively fabricated, thereby encouraging its widespread use.

Briefly, my invention combines a mirror and the heat-generating light into a single fixture which uses the heat generated from the light to defrost the image reflecting surface of the mirror.

It is to be understood that the invention is not limited to the particular embodiment shown in the accompanying drawing, for other constructions are possible within the scope and spirit of the appended claims.

BRIEF DESCRIPTION OF THE DRAWINGS

FIG. 1 is a perspective view of the defrosting mirror disclosed herein.

FIG. 2 is a sectional, elevational view taken along line 2—2 in FIG. 1.

FIG. 3 is a sectional elevational view taken along line 3—3 in FIG. 1.

DESCRIPTION OF THE PREFERRED EMBODIMENT(S)

Figure 4:
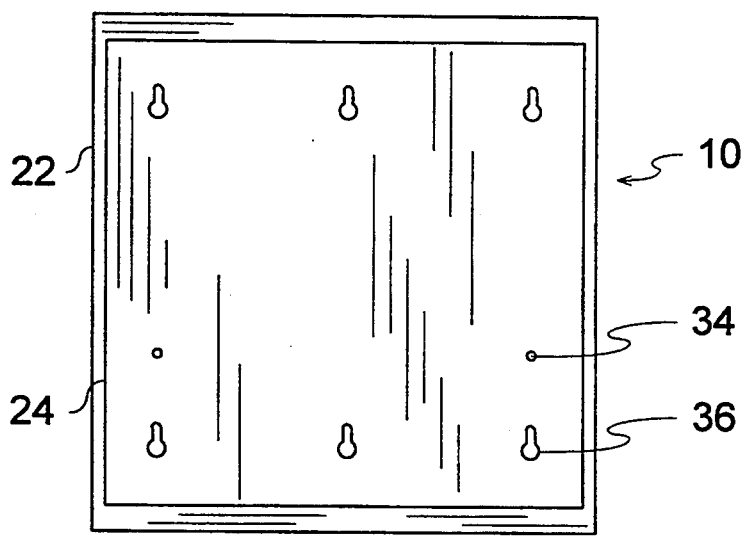
FIG. 4 is a rear, plan view of the defrosting mirror.

Described herein is a defrosting mirror, denoted generally by the reference number 10 in FIGS. 1–4. The defrosting mirror 10 comprises a planar mirror 12 having a front, image reflective surface 12(a) and a rear surface 12(b). The mirror 12, which is square or rectangular shaped and made of glass or stainless steel material, is attached over the front surface of a box structure 14. The box structure 14 has four rectangular shaped panels attached together along their edges, a front panel 22, a back panel 24, and two side panels 26. The top and bottom areas of the box structure 14 are opening thereby forming top and bottom openings 28, 30, respectively.

Manufactured near the top and bottom edges of the front panel 22 are two enfolded edges 32 in which two, facing channels 23 are formed. During manufacturing, the top and bottom edges 52, 54, respectively, of mirror 12 are placed inside the channels 23 so that the mirror 12 is disposed between the enfolded edges 32 directly in front and adjacent to the front panel 22. The rear surface of the mirror 12 is placed against the front surface of front panel 22 so that heat may be conducted thereto.

Housed inside the box structure 14 directly behind the front panel 22 is at least one heat-generating light tube 16. In the preferred embodiment shown in FIG. 3, the light tube 16 is disposed between two electrically energized light tube fixtures 18 which are attached to the inside surface of the rear panel 24.

During operation, heat generated by the heat-generating light tubes 16 heats the front panel 22 which acts as a heat-conductive surface to evenly distribute heat to the mirror 12. In the preferred embodiment, the front panel 22 is made of aluminum, copper, or stainless steel material. The heat-generated light tube 16 is an incandescent light or halogen light having sufficient wattage and heat generating capacity to be used both as a light source and a heat source for the mirror 12. The light tube fixtures 18 are mounted with screws 34 to the inside surface of the back panel 24. In the preferred embodiment, the light tube fixtures 18 are located approximately ⅓ the length of the back panel above the bottom opening 30 of the box structure 14 directly behind the front panel 22. The light tube 16 illumines the surroundings (e.g., the ceiling and the counter top) through the top and bottom openings 28, 30, respectively, of the box structure 14. The box structure 14 itself, may also be made of heat-conducting material such as aluminum or stainless steel material, so that heat generated from the light tube 16 can also be effectively and evenly conducted to the edges of mirror 12.

Figure 5:
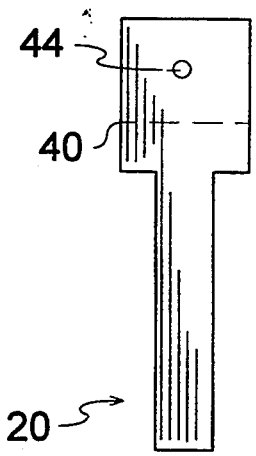
FIG. 5 is a flattened plan view of the brace.

The back panel 24 of the box structure 14 has a plurality of mounting holes 36 manufactured therein which are used to affix the defrosting mirror 10 in a vertical position on a wall. An optional brace 20 may be attached to the rear surface of the back panel 24 so that the defrosting mirror 10 may be placed in an upward on a horizontal surface. As shown in FIG. 5, the brace 20 is bent along line 40 approximately 60 degrees with the upper portion thereof being attached with a screw 42 through a hole 44 manufactured on the back panel 24.

Certain modifications and changes may be made to the invention to make in more marketable, such as using it in combination with a medicine cabinet.

I claim:

1. A surroundings illuminating defrosting mirror, comprising;
   a) a mirror, said mirror having an image-reflecting surface and a back surface;
   b) a box structure having a front panel, a back panel, and two side panels, said mirror being disposed over said front panel of said box structure, said box structure having a top which is entirely open enabling a light source located inside said box structure to illuminate the surroundings; and,
   c) a heat-generating light source, said light source being disposed inside said box structure and behind said mirror, said heat-generating light source being capable of generating sufficient heat to defrost said image-reflecting surface on said mirror and illuminate the surroundings.

2. A surroundings illuminating defrosting mirror, comprising;
   a) a mirror, said mirror having an image-reflecting surface and a back surface;
   b) a box structure having a front panel, a back panel, and two side panels, said mirror being disposed over said front panel of said box structure, said box structure having a bottom which is entirely open enabling a light source located inside said box structure to illuminate the surroundings; and, c) a heat-generating light source, said light source being disposed inside said box structure and behind said mirror, said heat-generating light source being capable of generating sufficient heat to defrost and illuminate the surroundings and said image-reflecting surface on said mirror.

3. A surroundings illuminating defrosting mirror, as recited in claim 2, further comprising a plurality of mounting holes positioned on said back panel of said box structure for installing said defrosting mirror in a vertical position on a wall.

4. A surroundings illuminated defrosting mirror, as recited in claim 3, further comprising a brace affixed on said back panel of said box structure, said brace capable of supporting said box structure in diagonal position on a substantially horizontal plane.

* * * * *